United States Patent [19]

Ginkel

[11] Patent Number: 4,980,782
[45] Date of Patent: Dec. 25, 1990

[54] SOFTWARE PROTECTION AND IDENTIFICATION SYSTEM

[76] Inventor: Peter Ginkel, 1275 Northcliff Trace, Roswell, Ga. 30076

[21] Appl. No.: 740,510

[22] Filed: Jun. 3, 1985

Related U.S. Application Data

[63] Continuation-in-part of Ser. No. 388,036, Jun. 14, 1982, Pat. No. 4,858,036.

[51] Int. Cl.⁵ ............................ G11B 5/00; G11B 9/00
[52] U.S. Cl. ...................................... 360/60; 360/135; 364/200; 411/394
[58] Field of Search .................... 360/60, 135, 53

[56] References Cited

U.S. PATENT DOCUMENTS

| | | |
|---|---|---|
| 2,881,073 | 4/1959 | Maclay . |
| 3,245,062 | 4/1966 | Kornei . |
| 3,564,156 | 2/1971 | Greiner et al. . |
| 3,883,892 | 5/1975 | Kneller et al. ........................ 360/59 |
| 4,239,959 | 12/1980 | Gutterman .......................... 235/493 |
| 4,313,140 | 1/1982 | Keidl ..................................... 360/77 |
| 4,462,078 | 7/1985 | Ross ..................................... 364/300 |
| 4,584,641 | 4/1986 | Guglielmino ........................ 364/200 |

FOREIGN PATENT DOCUMENTS

| | | | |
|---|---|---|---|
| 54-58012 | 5/1979 | Japan ..................................... 360/60 |
| 2131580 | 6/1984 | United Kingdom ................. 360/60 |
| 2137533B | 7/1986 | United Kingdom . | |

Primary Examiner—Stuart N. Hecker
Assistant Examiner—Alyssa H. Bowley
Attorney, Agent, or Firm—Jones, Askew & Lunsford

[57] ABSTRACT

A method of protecting machine readable signals recorded on magnetic recording media from unauthorized duplication and use. The signals to be protected are recorded on an authorized magnetic recording medium having a relatively high coercivity. An attempt is made by the computer to alter predetermined validating signals on a recording medium presented for use in the computer. The computer is disabled from further using the signals recorded on the recording medium if the validating signals cannot be read back. If the protected signals have been copied onto an unauthorized recording medium having a relatively lower coercivity and such unauthorized recording medium is presented to the computer, the validating signals will be alterable. Thus, an unauthorized copy of the protected signals cannot be used since the system detects that the validating signals have been changed and disables the system.

14 Claims, 2 Drawing Sheets

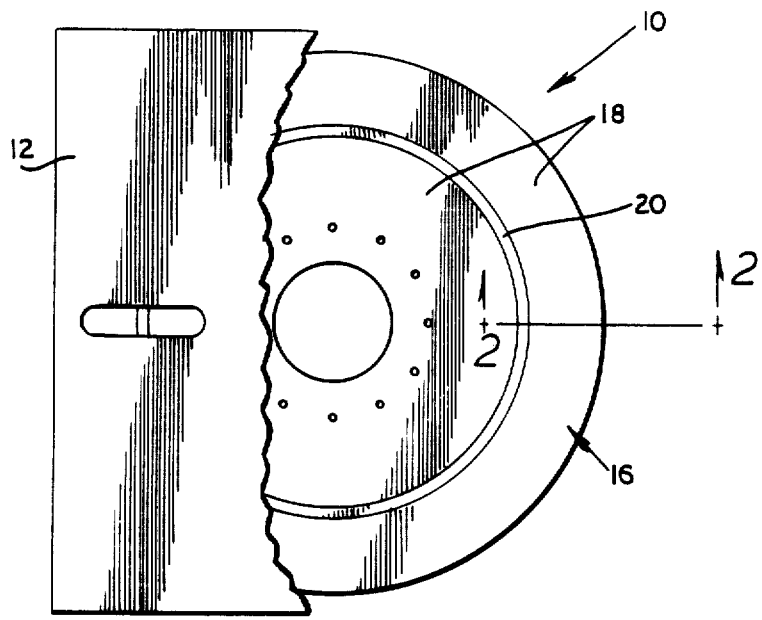
Fig_1
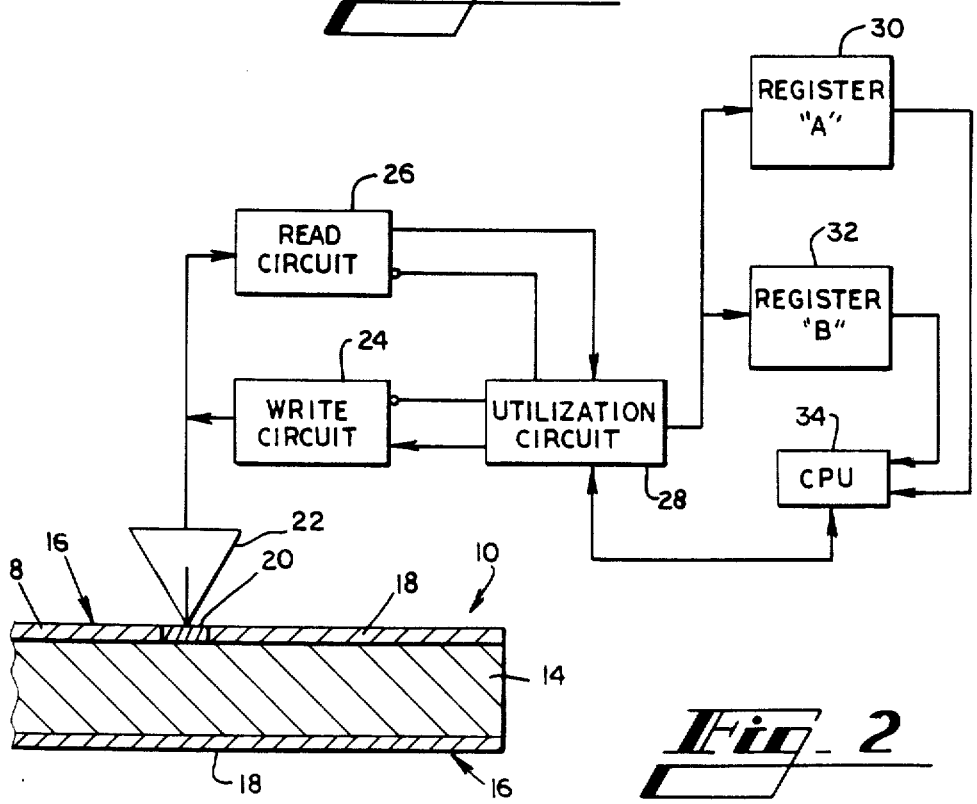
Fig_2

SOFTWARE PROTECTION AND IDENTIFICATION SYSTEM

CROSS-REFERENCE TO RELATED APPLICATION

This application is a continuation-in-part of application Ser. No. 388,036, filed June 14, 1982, now U.S. Pat. No. 4,858,036, issued 8/15/89.

FIELD OF THE INVENTION

The present invention relates to a system for protecting machine readable signals recorded on magnetic recording media from unauthorized duplication and use.

BACKGROUND OF THE INVENTION

The protection of information recorded on magnetic recording media from unauthorized duplication and use has been a recent subject of considerable interest. This interest has assumed even greater proportions with the proliferation of "personal computers". The success of the "personal computer" is due in large part to the wide assortment of software systems which are available for use therewith. A variety of games, accounting programs, sophisticated scientific programs, graphics programs, data management programs and the like and presently available for purchase by the "personal computer" user. Although such software is usually protected under the copyright laws of the United States, the temptation to duplicate a copy of the software for a friend, or to rent a copy for unauthorized duplication, is often too great to resist. Accordingly, the unlawful duplication and use of copyrighted software has become a major problem.

There are known various methods for the prevention of duplication of magnetically recorded signals, software and/or data bases. One such method involves altering the format of the software stored on a disk or tape in such a manner as to confuse standard computer operating system based copying routines, thereby rendering the stored software uncopyable. This method of protection, however, can be easily defeated through the use of format independent copying routines.

Other methods of protection involve the attachment of specialized electronic devices to the computer system's hardware. Such devices, however, unnecessarily limit the use of the computer hardware and require user cooperation to be effective. The employment of an additional piece of hardware also makes such methods expensive.

Accordingly, the protection systems which have been known heretofore have not been completely satisfactory.

SUMMARY OF THE INVENTION

The present invention relates to a method and apparatus for protecting machine readable signals recorded on magnetic recording media from unauthorized duplication and use. The signals to be protected are recorded on a first portion of the magnetic recording media. The protected signals on the first portion can be detected and altered by the machine. Second signals are recorded on a second portion of the magnetic recording media. The second signals on the second portion can be detected by the machine but cannot be altered by the machine. Program instructions recorded on the media command the machine to attempt to alter the second signals on the second portion. Then, if the second signals are altered on said second portion, the machine is disabled from further utilization of the signals recorded on the recording media.

In another embodiment, the signals are recorded on a uniformly "hard" recording medium which cannot be altered by many conventional recording media reading devices. As in the first embodiment, program instructions command the machine to attempt to alter signals on the authorized medium. if the signals are successfully altered, the machine is disabled from further utilization of the signals, since the signals have been copied onto a conventional and unauthorized "soft" recording medium.

Accordingly, it is an object of the present invention to provide an improved system for protecting machine readable signals recorded on magnetic recording media from unauthorized duplication and use.

Another object of the present invention is to provide a user transparent system for the prevention of unauthorized duplication and use of magnetically recorded computer software, data bases and the like.

A further object of the present invention is to provide a system for the prevention of unauthorized duplication and use of magnetically recorded signals while permitting the copying of the recorded signals for back-up purposes.

Another object of the present invention is to provide for indelible identification of magnetic recording media, for example, by permanently encoding a magnetic serial number thereon.

These and other objects, features and advantages of the present invention will become apparent after a review of the following detailed description of the preferred embodiment and the appended drawings and claims.

BRIEF DESCRIPTION OF THE DRAWINGS

FIG. 1 is a front view of a disclosed embodiment of a magnet information storage disk made in accordance with the protection system of the present invention shown with the disk jacket partially broken away for clarity.

FIG. 2 is a schematic view of a disclosed embodiment of a typical computer system, including a magnetic read/write head and a magnetic information storage disk, useful with the protection system of the present invention.

DETAILED DESCRIPTION OF THE DISCLOSED EMBODIMENT

Figure 3:
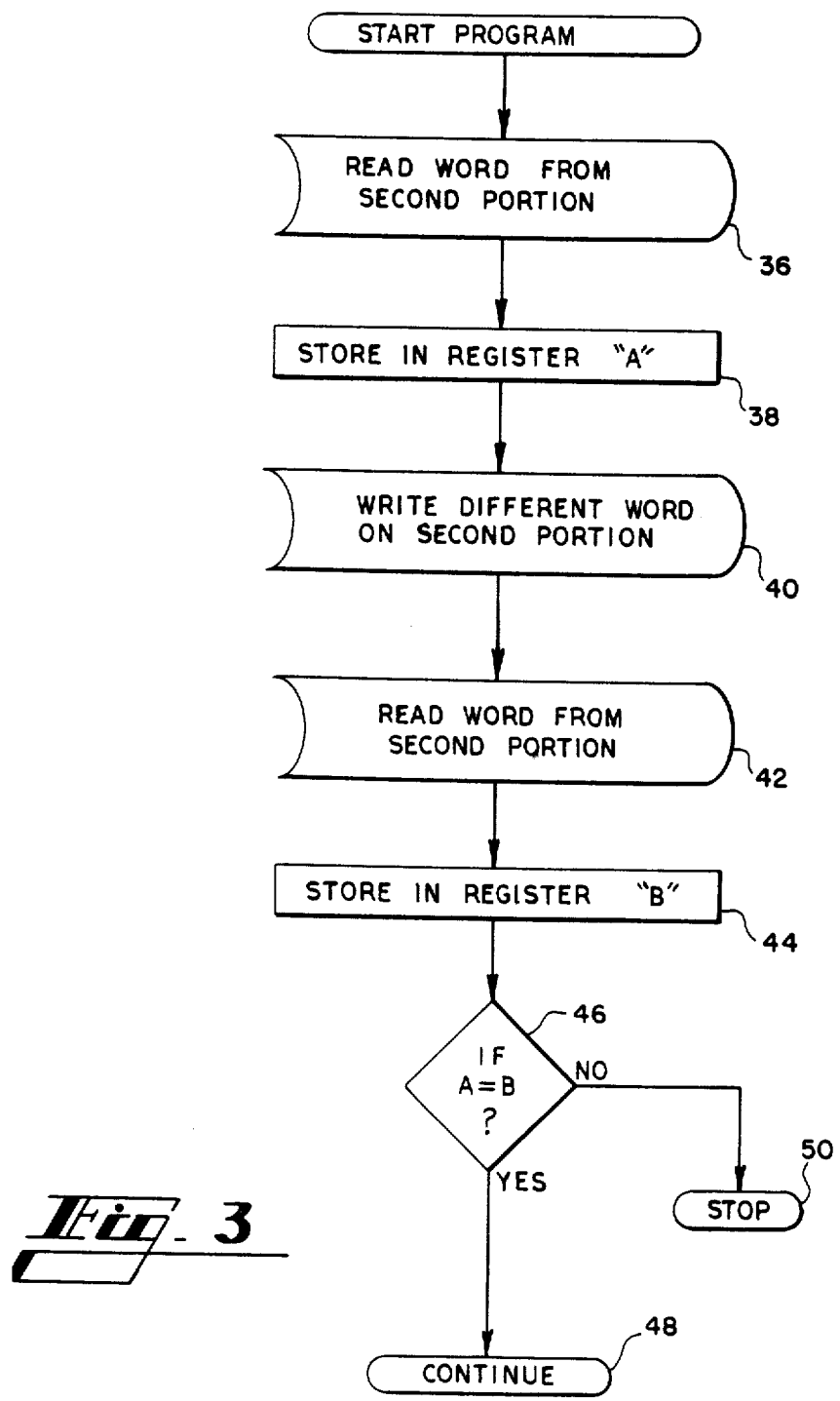
FIG. 3 is a view of a flow chart of a disclosed embodiment of the protection system of the present invention.

Referring now to the drawings in which like numbers indicate like elements throughout the several views, it will be seen that there is a magnetic information storage disk, more commonly referred to as a "floppy disk" 10. Although the magnetic storage media of the present invention is illustrated as being a disk, it is specifically contemplated that the protective system of the present invention is also useful with other types of magnetic storage media, such as tapes, drums, hard disks, cards and the like. Accordingly, it is expressly understood that although "disks" may be described in connection with the disclosed embodiments, the present invention also applies to other magnetic storage media such as tapes, etc.

The floppy disk 10 is contained in a jacket 12 which protects the disk when not in use, as is conventional in the art. The disk 10 comprises a non-magnetic substrate 14, such as a plastic material, for example, polyethylene terephalate, which supports on its surface a thin layer or coating 16 of a magnetic material, usually contained in a nonmagnetic binder, such as polyurethane. The magnetic coating 16 is divided into two portions. The first portion 18 includes a layer of a conventional magnetic material, such as iron oxide ($Fe_2O_3$) or chromium oxides.

Such materials have relatively high magnetic permeability and low magnetic coercivity and can be referred to as magnetically "soft". That is, signals can be encoded thereon or erased therefrom by the application of relatively weak magnetic fields (usually less than 1000 oersteds). The second portion 20 includes a layer of magnetic material having a relatively high magnetic coercivity and can be referred to as magnetically "hard". That is, signals can be encoded thereon or erased therefrom only by the application of relatively strong magnetic fields (usually greater than 1000 oersteds). Magnetic materials possessing relatively high permeability and high coercivity include, for example, Alnico (V), iron/platinum alloys, magnetic ceramics and the like. Other factors affecting magnetic coercivity include the size and shape of the particles of the magnetic material. Additional resistance to erasure or overwriting by the application of relatively low strength magnetic fields can be provided by interposing a nonmagnetic protection overlayer, such as a plastic film, between the magnetic material and the magnetic field source. While a protective coating may decrease the flux density at the signal detector, magnetically "hard" materials having higher magnetization levels (remanence or retentivity) can be employed in order to compensate for the reduction in signal strength and provide acceptable signal-to-noise levels at the signal detector. In certain applications, such as high density information storage, an overlayer may be disadvantageous.

Other methods of increasing the coercivity of the signal by the magnetic material include magnetic annealing, etching and the like. See U.S. Pat. Nos. 2,881,073; 3,245,062; 3,564,156; 3,883,892; 4,239,959 and 4,313,140 (all incorporated herein by reference). Such methods are also useful with the present invention.

The disk 10 is designed to be used in conjunction with a device: (1) for detecting the signals recorded thereon and (2) for altering the signals recorded thereon either by erasing the signals, by placing signals thereon where none existed or by overwriting the signals, i.e., changing signals on the disk to different signals. The foregoing operations are performed by applying a magnetic field of a predetermined strength to the magnetic material, in a manner well known in the art, by a conventional read/write head 22 (FIG. 2) as is typically found in a disk drive unit (not shown).

A disk drive, in addition to containing the read/write head 22, also contains motors for rotating the disk 10 at a relatively high speed, e.g. 360 RPM, and for radially moving the read/write head with respect to the rotating disk so that signals from various "tracks" on the disk can be detected and altered as desired.

The magnetic field produced by the read/write head 22 at the surface of disk 10 is of a known strength for any given disk drive. Also, for commercially available floppy disk drives, the magnetic field strength produced at the disk surface during write operations will be within a known range of values, for example, usually substantially less than 1000 oersteds. The selection of the particular method or materials used in constructing the first portion 18 and the second portion 20 of the magnetic coating 16 is therefore critical in the following respect. The magnetic coating 16 in the first portion 18 must have a retentivity and coercivity such that signals recorded on the coating can be detected by the read/write head 22, and, optionally, altered by the read/write head; the magnetic coating in the second portion 20 must have a characteristic retentivity so that signals recorded on the coating can be detected by the read/write head, and a coercivity such that the signals cannot be substantially altered by the read/write head. Stated another way, the second portion 20 of the disk 10 is a read only portion. Accordingly, the coercivity of the magnetic coating will depend on the strength of the read/write head of the particular disk drive. However, it is useful in the present invention that the ratio of magnetic coercivity of the second portion 20 and the first portion 18 be greater than 2 to 1. It is within the skill of the art to select the method and material from which the magnetic coating 16 is constructed to obtain the foregoing properties.

With particular reference to FIG. 2, the read/write head 22 is used in conjunction with a conventional computer hardware system including a write circuit 24, a read circuit 26, a utilization circuit 28, a register "A" 30, a register "B" 32 and a central processing unit (CPU) 34. Each of the foregoing items 22–34 are well known in the art.

The CPU 34, the utilization circuit 28 and the read circuit 26 permit the read/write head 22 to read data from the disk 10 by detecting signals recorded thereon. The CPU 34, the utilization circuit 28 and the write circuit 24 cause the read/write head 22 to alter the signals recorded on the disk 10 by applying a magnetic field of a predetermined strength thereto Signals recorded on the disk 10 which are read by the read/write head 22 can be stored in any of a plurality of random access memory locations within the computer system, such as in registers "A" and "B" 30, 32. Information in the registers "A" and "B" can be accessed by the CPU 34 and processed as desired in the conventional manner.

In order to protect computer software against unauthorized duplication and use, a software manufacturer places the computer program on the disk 10 as a series of signals in the following manner. It should be understood that the present invention is not limited to computer software but includes any other type of signal recorded on the magnetic media for which protection from unauthorized duplication and use is desired.

A computer program for which protection is desired is recorded and stored on the first portion 18 of the disk 10 in the conventional manner. In addition, a desired signal is recorded on the second portion 20 of the disk 10 using techniques in accordance with the present invention to render the desired signal permanent, or read only, with respect to the read/write head 22. This desired signal can take virtually any form, such as a serial number, a sophisticated coding key or the like. For purposes of an example, assume that the number "1" is recorded on the second portion 20 of the disk 10.

The disk 10 is formatted in such a manner that the following instructions are read into the computer after the disk 10 is inserted into the disk drive and reading of the disk by the read/write head 22 is begun. The read/write head 22 is instructed to read the number recorded on the second portion 20 of the disk 10, such as at 36, and store that number in register "A" 30, such as at 38. The read/write head 22 is then instructed to alter the number recorded on the second portion 20 of the disk 10, such as at 40, by either erasing the number or writing a different number in its place, such as the number "0". Since the magnetic field produced by the read/write head 22 is insufficient to alter the number "1" recorded on the second portion 20, the number "1" remains recorded on the second portion and is not replaced by the number "0".

The read/write head 22 is then instructed to again read the number recorded on the second portion 20 of the disk 10, such as at 42, but this time to store that number in register "B" 32, such as at 44. The CPU 34 is then instructed to compare the number stored in register "A" 30 with the number stored in register "B" 32, such as at 46. If the number stored in register "A" 30 is identical to the number stored in register "B" 32, the read/write head 22 is instructed to continue, such as at 48, typically by reading into the computer random access memory the computer program for which protection is desired. If the number stored in register "A" 30 is different from the number stored in register "B", any further use of the protected program by the computer is disabled by, for example stopping the CPU 34, such as at 50, stopping the read/write head 22, instructing the read/write head to erase or otherwise alter the protected program recorded on the first part of the disk 10, to not load the protected program into the computer's random access memory, to dump all information stored in the computer's random access memory or the like.

It will be appreciated that when the disk 10 is read in the foregoing manner, the number in the second portion 20 of the disk is unaltered, the number in registers "A" and "B" are identical and the program is permitted to continue. The information on both the first portion 18 and the second portion 20 can then be copied onto a conventional floppy disk (not shown), i.e. a disk which can be altered by the read/write head 22, if desired. The protected program copied onto the conventional disk by conventional methods, however, cannot be used, unless copied back onto the disk 10, for the reasons described below.

When the conventional disk is loaded into the disk drive, the same instructions and steps are followed as with the disk 10. The difference, however, is that when the read/write head 22 is instructed to alter the number which is in the space on the conventional disk which corresponds to the second portion 20, the read/write head is successful in altering that information. Therefore, the number stored in register "A" 30 is "1" and the number stored in register "B" 32 is "0". When the two registers 30, 32 are compared, the numbers are not identical and the computer is disabled, or stopped, from further processing.

It is specifically contemplated that other procedures using the foregoing principles can also be successfully employed. For example, the first reading step can be eliminated so that the program merely attempts to erase a known signal in the second portion and then checks to see if the known signal is still present. Conversely, no signal can be recorded in the second portion 20. The program can attempt to write a signal in the second portion 20 and, then, check to see if it is successful.

The significant step is attempting to alter the signal (or lack of signal) recorded on the second portion 20 of the disk 10 using a read/write head 22 which is incapable of altering signals recorded on the second portion, but which can alter signals on conventional disks. Then, checking the second portion to determine if any alteration was actually made in the signal recorded on the second portion, or the portion of a conventional disk corresponding to the second portion. If the signals on the second portion are unaltered, the disk is an authorized copy. If the signals on the second portion are altered, the disk is an unauthorized duplicate and further use of the information recorded on the disk is prevented.

In another embodiment of the present invention, the machine readable signals or software may be protected by recording the signals on an authorized recording medium which has a high or "hard" magnetic coercivity relative to many commonly available media employed in many computer systems. The protection scheme operates in that many disk drives commonly employed in many computer systems, which can produce relatively low level magnetic fields, cannot reliably alter signals recorded on a high coercivity or "hard" magnetic disk, but can alter signals on conventional "softer" disks.

For example, if a magnetic storage medium containing a uniform high coercivity magnetic coating is used to record signals for protection from unauthorized use, and a conventional write head of a disk or tape drive capable of producing a magnetic field too weak to reliably alter signals recorded on such a magnetically hard medium is used, then attempts to write information on such high coercivity disks or tapes will not be reliably successful. Accordingly, the method of the present invention will be able to distinguish an authorized, high coercivity disk or tape from a conventional or lower coercivity medium.

It will therefore be appreciated that this second embodiment of the present invention successfully protects against unauthorized copying and use of software by computer systems which contain normal, lower field strength disk or tape drives. In order for the scheme to be operable, a computer system with which the software is attempted to be used must be able to perform write operations which do not leave enough residual magnetization impressed on the magnetically hard storage medium for the read head to accurately detect. Of course, read heads are normally much more sensitive than required to detect normal magnetization impressed by the write head on normal media.

In the case of the present invention, wherein the signals to be protected are originally recorded on a higher coercivity medium, and a write operation is made by the lower field strength disk or tape drive, one or more bits of digital information will usually be "dropped", i.e., precise verification of the written information on the higher coercivity disk will fail. On the other hand, when the signals are copied to a lower coercivity medium, and a write operation is performed, precise and repeatable verification is possible. It will therefore be appreciated that instructions provided on the higher coercivity medium together with the programs or data to be protected includes steps to write predetermined information on a storage medium presented for use in the machine, followed by the step of reading the information from the location written. If the medium is the authorized, magnetically hard storage medium, the lower field strength disk or tape drive will not reliably have been able to write to the higher coercivity medium.

Specifically, the protection scheme comprises first encoding the program or data to be protected on a high coercivity medium, such as a 600 oersted disk, using higher magnetic field levels than are achievable by conventional disk or tape drives. For example, many conventional personal computer disk drives are only capable of reliably writing to 300 oersted magnetic disks. The 600 oersted disk will perform perfectly when read by the 300 oersted drives, but attempts to write to the higher coercivity disk using these lower strength drives will produce weak signals on the disk which will not reliably verify.

If the programs or data to be protected have been copied from the higher coercivity medium to a lower coercivity medium, the attempts to alter the validating signals will be successful, and steps in the program can then cause disablement of the computer system.

In particular, consider the case of a magnetically hard disk which has not been written by a strong magnetic field. This disk can be reversibly written by a weak field, which impresses some residual magnetization. A detectable signal can most often be read by many conventional read heads, which are normally designed to be sensitive to the field of the disk. If however the disk is prewritten by a strong magnetic field, a weak field cannot reliably alter the remnant signal. Such a disk containing a serial number or a protection code written by a strong magnetic field, with the remainder of the data or instructions being written by a weaker magnetic field, would allow convenient program modifications or data changes by conventional disk drives, and still provide effective copy protection. It will therefore be understood that the present invention is operative with uniformly hard magnetic media, even including possibly blank or unprerecorded regions, wherein protection codes or signals on the authorized medium are prewritten with a strong magnetic field.

It is expressly contemplated in the present invention that as electronics and information storage technology progresses, it may become possible to differentiate between areas on an information storage medium having only slightly different retentivities, or between storage media which display only slightly different magnetic characteristics. For example, the media themselves may be varied with controllable manufacturing tolerances to produce "authorized" media for distribution of software products and other "unauthorized" media for general user data storage. The homogeneity of the layers on the disk, and the characteristics of the magnetic particles themselves such as flatness and chemical composition, affect the ability to discriminate between areas on the disk.

Even though the relative difference between "hard" and "soft" media may decrease, the sensitivity of the electronics may still allow differentiation therebetween. Electrical parameters such as the sensitivity of the circuitry or the number of ampere-turns in the head, and mechanical parameters such as head clearance, warpage, and surface conditions on the disk, all have a bearing on discrimination. In addition, the electronics and read/write apparatus may be in varying states of maintenance and repair, thereby accentuating any pre-existing differences. All of these factors, as well as others, affect the ability to distinguish differences between media.

Accordingly, an important feature of the present invention is the ability to distinguish between such different areas of a medium or between such different media. Of particular significance in the second preferred embodiment, therefore, is that writing devices in many computer systems in the field cannot reliably change the prerecorded signals on the authorized medium.

It will also be understood that the present invention is not limited to "floppy" disks as storage media. Currently popular Winchester-technology or "hard" disks (wherein a rigid instead of flexible substrate is employed, which should not be confused with magnetically "hard" disks) can also be successfully employed in conjunction with the present invention. If the rigid disk is used as an unauthorized medium on which an unauthorized copy is placed, and the software is distributed on an authorized medium employing the present invention, the unauthorized copy will be inoperative in the manner described above. If the current trend toward use of rigid disks in personal computers continues, the present invention can be easily adapted to allow transfer from an authorized medium to a rigid disk by distributing the software on the authorized medium, and providing instructions as a part of the protected program to allow one-time installation on a rigid disk.

It will be appreciated that the properties of a magnetic storage medium for use in connection with the second embodiment of the present invention may be uniformly coated, layered, or segmented as described above in connection with the first embodiment of the present invention. It will also be appreciated that there must only be provided a hysteresis curve on the medium wherein the applied field strength of a disk or tape drive produces insufficient remnant magnetization induced in the medium to be consistently and reliably detectable by the read head of conventional standard disk or tape drives. It will also be appreciated that the protection scheme described will be operable as long as storage media can be provided which require field strengths for writing which exceed the field strengths exhibited by many computer systems.

It should also be understood that statistical functions to provide a decision level for determining when a medium presented for use is authorized or unauthorized may be employed in the present invention. For example, lower field strength disk or tape drives may successfully write to higher coercivity storage media occasionally. However, it has been found that such field strengths are successful only a predetermined percentage of attempts to write. Accordingly, and by way of example and not by way of limitation, tests which succeed fifty percent of n attempts to write, where n is a predetermined number, may be considered unauthorized, and therefore cause disablement of the computer system. Tests which are successful greater than ninety percent of the time can almost invariably be deemed unauthorized media, inasmuch as a disk drive capable of producing only say, 300 oersteds, cannot achieve ninety percent writing success rates on a 600 oersted storage medium.

It should be understood, of course, that the foregoing relates only to preferred embodiments of the present invention and that numerous modifications or alterations may be made therein without departing from the spirit and scope of the invention as set forth in the appended claims.

I claim:

1. A data protection system, comprising:

an authorized magnetic signal recording medium having a uniform high coercivity magnetic coating, signals recorded on said authorized medium being alterable by a magnetic field greater than or equal to a first intensity;

means for detecting signals recorded on a magnetic signal recording medium presented for use in connection with said system;

means for applying a magnetic field of a second intensity less than first intensity to said presented recording medium in response to predetermined instructions to alter signals recorded on said presented recording medium, said second intensity being at least a predetermined amount less than said first intensity; and means for disabling said system in response to detection by said detecting means of altered signals recorded on said presented recording medium, whereby a recording medium presented for use in connection with said system which is a copy of said authorized recording medium will result in said system being disabled since signals recorded on said authorized recording medium cannot be altered by said second intensity provided by said magnetic field applying means in said system.

2. The data protection system of claim 1, wherein said predetermined instructions in said system are recorded on said authorized recording medium.

3. The data protection system of claim 1, wherein said first intensity is greater than about 600 oersteds.

4. The data protection system of claim 1, wherein said second intensity is less than about 300 oersteds.

5. The data protection system of claim 1, wherein the difference between said first intensity and said second intensity is greater than about 300 oersteds.

6. A computer system, comprising:

an authorized magnetic information recording disk having a uniform high coercivity magnetic coating and including data to be protected form unauthorized use, signals recorded on said authorized disk being alterable only be a magnetic field having an intensity greater than a first intensity;

means for reading information stored on said disk;

means for writing information on said disk, said writing means capable of producing a magnetic field not greater than a second intensity less than said first intensity, said second intensity being at least a predetermined amount less than said first intensity;

means for attempting to write with said writing means predetermined digital signals on a disk presented for use with said computer system;

means for comparing said predetermined digital signals to information read by said reading means from said presented disk; and means responsive to said comparing means for disabling said computer system if information read from said presented disk equals said predetermined digital signals.

7. The computer system of claim 6, further comprising statistical decision-making means for writing said predetermined digital signals on said presented disk and for comparing said predetermined digital signals to information read by said reading means from said presented disk a predetermined number of times, and for computing a statistical parameter related to the success of reading back said predetermined digital signals from said presented disk, and wherein said disabling means is responsive to disable said computer system in response to said statistical parameter.

8. A method of protecting against the unauthorized duplication and use of computer software, comprising the steps of:

providing an authorized storage medium having a uniform high coercivity magnetic coating, said coating having a magnetic coercivity greater than or equal to a first coercivity;

recording validating signals on said authorized storage medium with a magnetic field strength greater than or equal to a first magnetic field strength;

recording computer software on said authorized storage medium;

attempting to alter said validating signals on a magnetic storage medium presented for use in a computer system with a writing means associated with said computer system;

reading signals corresponding to said validating signals on said presented magnetic storage medium; and disabling said computer system to prevent use of said computer software if said validating signals are not read by said computer system, whereby a computer system having writing means which cannot provide a field strength about the same as said first magnetic field strength will be disabled.

9. The method of claim 8, further comprising the steps of:

repeatedly attempting a predetermined number of times to alter said validating signals on said presented magnetic storage medium;

repeatedly reading said predetermined number of times signals corresponding to said validating signals on said presented magnetic storage medium;

computing a statistical parameter of the success of altering signals on said presented medium corresponding to said validating signals; and disabling said computer system in response to said statistical parameter.

10. The method of claim 9, wherein said statistical parameter is the percentage of success of altering signals on said presented medium.

11. The method of claim 8, wherein said first magnetic field strength is about 600 oersteds.

12. The method of claim 11, wherein computer system writing means can provide a field strength of less than about 300 oersteds.

13. The method of claim 8, wherein when the difference between said first magnetic field strength and the strength provided by said writing means is greater that a predetermined difference, said computer system is disabled.

14. The method of claim 13, wherein said predetermined difference is about 300 oersteds.

* * * * *